(12) United States Patent  (10) Patent No.: US 8,015,409 B2
Wilkinson, Jr. et al.  (45) Date of Patent: Sep. 6, 2011

(54) AUTHENTICATION FOR LICENSING IN AN EMBEDDED SYSTEM

(75) Inventors: John C. Wilkinson, Jr., Hudson, OH (US); Taryl J. Jasper, South Euclid, OH (US); Michael D. Kalan, Highland Heights, OH (US); Nicholas L. Perrotto, Jr., Brecksville, OH (US); Glenn B. Schulz, Lannon, WI (US); James A. Meeker, Lyndhurst, OH (US); Kevin M. Tambascio, Lyndhurst, OH (US); Jack M. Visoky, Cleveland Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1204 days.

(21) Appl. No.: 11/627,477

(22) Filed: Jan. 26, 2007

(65) Prior Publication Data

US 2008/0082449 A1 Apr. 3, 2008

Related U.S. Application Data

(63) Continuation-in-part of application No. 11/537,413, filed on Sep. 29, 2006, now Pat. No. 7,541,920.

(51) Int. Cl.
*H04L 9/32* (2006.01)
(52) U.S. Cl. ........ 713/173; 713/156; 713/171; 713/175; 713/168; 713/182; 705/59
(58) Field of Classification Search .............. 705/59; 713/171, 173, 175, 168, 182, 189, 156; 717/177
See application file for complete search history.

(56) References Cited

U.S. PATENT DOCUMENTS

| 5,568,552 | A | * | 10/1996 | Davis ........................... 705/59 |
| 5,940,591 | A | | 8/1999 | Boyle et al. |
| 6,240,183 | B1 | | 5/2001 | Marchant |
| 6,539,478 | B1 | | 3/2003 | Furuya et al. |
| 6,691,231 | B1 | | 2/2004 | Lloyd et al. |
| 6,725,104 | B2 | | 4/2004 | Lo et al. |
| 6,895,502 | B1 | | 5/2005 | Fraser |
| 7,079,020 | B2 | | 7/2006 | Stilp |
| 7,171,662 | B1 | * | 1/2007 | Misra et al. ................. 717/177 |
| 2003/0023867 | A1 | | 1/2003 | Thibadeau |

(Continued)

FOREIGN PATENT DOCUMENTS

CN 1602643 A 3/2005

(Continued)

OTHER PUBLICATIONS

Office Action mailed Sep. 15, 2008 for U.S. Appl. No. 11/537,413, 26 pages.

(Continued)

*Primary Examiner* — Thanhnga B Truong
*Assistant Examiner* — Angela Holmes
(74) *Attorney, Agent, or Firm* — Turocy & Watson LLP; R. Scott Speroff; John M. Miller

(57) ABSTRACT

An industrial automation system is provided. This includes at least one license component that is granted by a third party to permit access to a portion of an industrial control component. At least one protocol component that is based in part on a private key exchange facilitates authentication and access to the portion of the industrial control component.

28 Claims, 10 Drawing Sheets

U.S. PATENT DOCUMENTS

| | | | |
|---|---|---|---|
| 2003/0028488 A1* | 2/2003 | Mohammed et al. ........... | 705/59 |
| 2003/0060900 A1 | 3/2003 | Lo et al. | |
| 2005/0210532 A1 | 9/2005 | Winick | |

FOREIGN PATENT DOCUMENTS

| | | |
|---|---|---|
| CN | 1611088 A | 4/2005 |
| WO | 03034774 A2 | 4/2003 |
| WO | 03041422 A2 | 5/2003 |
| WO | 2005/088893 A1 | 9/2005 |

OTHER PUBLICATIONS

Offica Action mailed Sep. 18, 2009 for Chinese Patent Application No. 200710306678.2, 6 pages.

"The Application of the Distributive Half Duplex Wireless Communication Technique in Industrial Alarm/Control System", pp. 78-81, Jan. 1, 2002.

Offica Action mailed Aug. 30, 2010 for Chinese Patent Application No. 200710306678.2, 9 pages.

* cited by examiner

AUTHENTICATION FOR LICENSING IN AN EMBEDDED SYSTEM

CROSS REFERENCE TO RELATED APPLICATION

This application is a continuation-in-part of U.S. patent application Ser. No. 11/537,413, filed Sep. 29, 2006, and entitled ALARM/EVENT ENCRYPTION IN AN INDUSTRIAL ENVIRONMENT, the entirety of which is incorporated herein by reference.

TECHNICAL FIELD

The subject invention relates generally to industrial control systems and more particularly to providing an authentication protocol for industrial control systems that employs a license component as part of an encrypted authentication and licensing process.

BACKGROUND

Industrial controllers historically have operated in tightly-controlled factory networks were a plurality of controllers and associated modules communicate. These lower level control elements often are in communication with higher level computing systems or servers that aggregate data from the controllers and help to manage day-to-day activities of an enterprise. In recent years however, control systems have increasingly become adapted for Ethernet communications which have opened these systems up to global networks such as the Internet. While it is advantageous for control systems to communicate across such global networks, other problems have ensued such as how to protect sensitive control systems and related intellectual property stored thereon from corruption or worse—cyber attack. Until now, various methods have been employed to authenticate network parties that need to communicate to control systems over public networks. These methods have often placed the burden on the control system to not only authenticate a respective party but to also be responsible for determining which parties should be allowed access to which portion of the control system.

Controllers provide an embedded approach where resources are limited for activities such as determining and authorizing who or what should access the controller. Generally, the controller or control systems in general need what limited processing and storage capabilities they have to be employed for automated manufacturing operations. Prior attempts at granting access to the valuable intellectual property contained within a controller (or control component) was to employ an external server to check whether or not a particular device or software component was licensed for such access. Protocols may have been employed that were specific to one party, company, or product for gaining subsequent controller access (e.g., passwords) yet not using more secure schemes in the process.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A licensing protocol is provided to enable encrypted authentication between industrial control components and other components seeking access to the industrial control components. A component such as a device or software seeking access to a controller employs a license generating component to seek an electronic certificate that is proof that the device has been properly licensed to access the controller. A license certificate can be used to provide such proof where an encryption component such as a private key can be employed to prove a component desiring access to the control system is an authentic holder of the license. One or two way authentication protocols can be provided to subsequently grant access from the control system to the accessing device or software. By employing the license generating component to determine if proper licensing agreements have been maintained, controller resources can be conserved. Also, since encryption technologies are employed as part of the authentication process after the license has been obtained, security is increased over prior systems. Thus, an architectural framework is provided to protect intellectual property within control components, where the framework determines that the module communicating with a control component is a module that is suitably licensed. Thus, additional functionality can be made available to the licensed module since its identity is known.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

A licensing protocol for an industrial automation system is provided. In one aspect, an industrial automation system is provided. This includes at least one license component that is granted by a third party to permit access to a portion of an industrial control component. At least one protocol component that is based in part on a private key exchange facilitates authentication and access to the portion of the industrial control component. Single or mutual authentication protocols can be provided to support the desired access to the industrial control component.

It is noted that as used in this application, terms such as "component," "protocol," "certificate," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
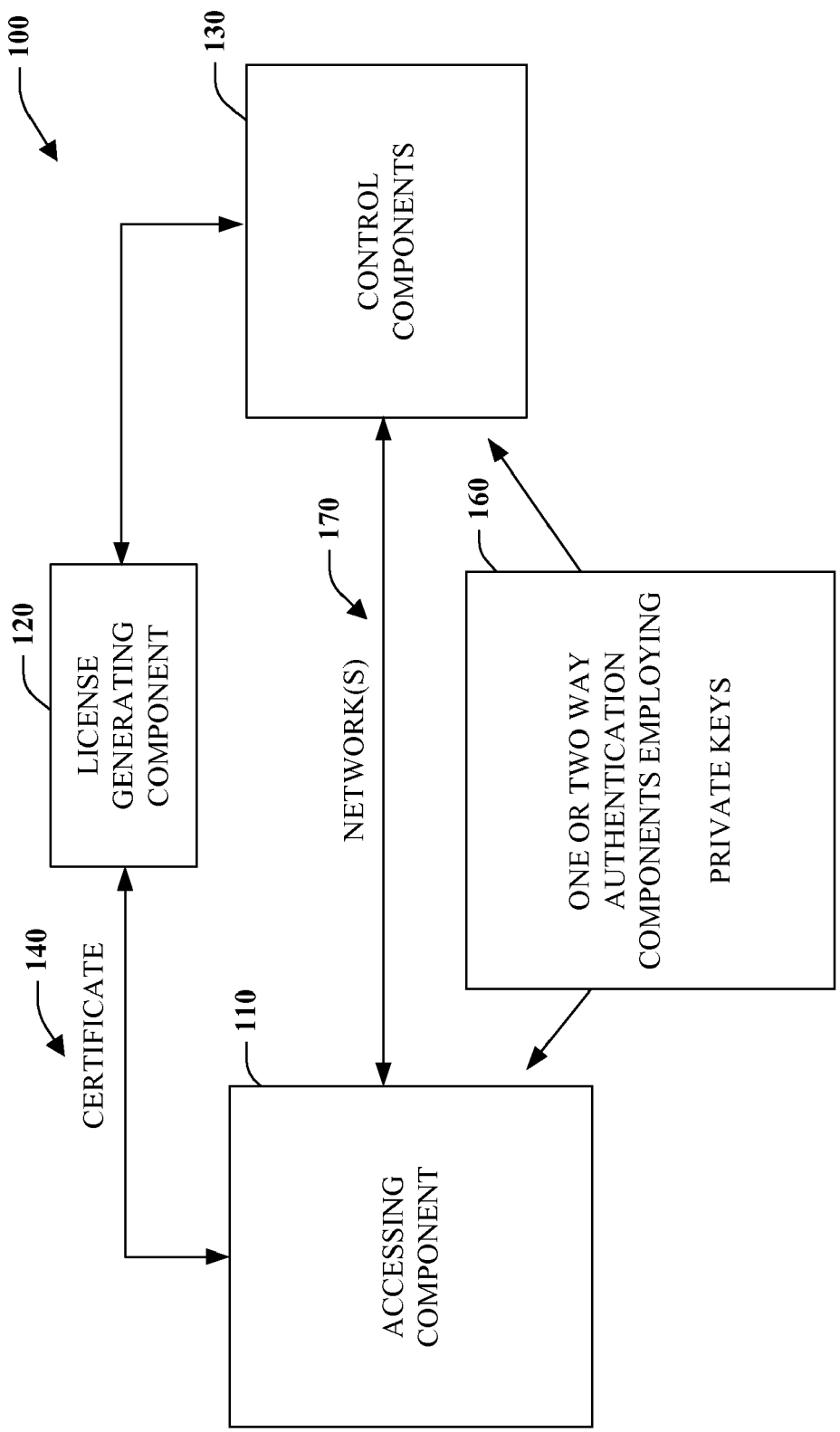
FIG. 1 is a schematic block diagram illustrating automated licensing for an industrial automation system.

Referring initially to FIG. 1, a system 100 illustrates automated licensing for an industrial automation system. An accessing component 110 interacts with a license generating component (LGC) component 120 to receive licensing rights to one or more control components 130. The LGC 120 may be a computer operated by a business that sells rights to the accessing component 110 in order to access all or portions of the control components 130 (e.g., rights to access portions or memory, access alarms, events, programs, recipes, and so forth). For example, the LGC 120 could be the manufacturer of the control components 130, the owner of the control components, or a third party deemed suitable to generate licenses. As illustrated, a certificate 140 can be issued by the third party component 120 to the accessing component 110, where the certificate is employed in accordance with an authentication component 160 to gain access to the control components 130 across a network (or networks) 170. In general, the authentication component 160 utilizes the certificate 140 and one or more security protocols such as private keys to gain access to the control components 130. As will be described in more detail below with respect to FIG. 2, a one way authentication process can be employed at 160, whereas FIGS. 3-8 illustrate aspects of a mutual authentication process.

The authentication component 160 can be employed by two or more components to authenticate between such components across the network 170, where authenticate implies establishing a substantially secure and trusted connection to exchange data. Accessing components 110 may employ one or more computers, industrial components, or other network components that communicate across the network 170 to one or more industrial control components 130 such as represented by programmable logic controllers (PLCs) 130 (or other factory components as noted below). It is noted that the accessing component 110 could also be other control components that are similar in nature to the control components 130.

The authentication component 160 enables authentication between industrial control components 130 and accessing components 120 after a certificate 140 has been issued. In one aspect, a cryptographic authentication protocol is provided by the authentication component 160 that employs a one-way or mutual authentication scheme based in part on an asymmetric key system that generally does not require a public key infrastructure to be present. The protocol is such that it is resistant to commonly known attacks. In this manner, a cryptographic-based authentication protocol provides a technical barrier to unauthorized applications and devices participating on an industrial automation network 170 that includes controllers, I/O modules, factory devices, computers, servers, clients, and/or other network components.

Some basic aspects of licensing are now discussed before more detailed aspects that are discussed below with respect to FIGS. 2-9. Licensing often involves two or more processes. First, there is the issuance of a license by the LGC 120 to a vendor (called the licensee or accessing component). Secondly, client implementations created by the licensee should include the acts to provide and validate the authenticity of the licenses at runtime.

When a licensee obtains a license from the LGC 120, electronic copies of at least two artifacts are received and used in a license authentication protocol described below. This can include a license certificate 140 which can be used to demonstrate to the protected hardware/software at 130 the existence of a valid license that has been issued by the LGC 120. For instance, the LGC 120 may own one or more of the control components 130 and thus grant licenses to access the components. A private key at 160 can be used by licensees to prove themselves as the authentic holder of the license certificate 140.

Generally, the license certificate 140 is an electronic document that contains information about the licensee, what type of license they hold, and a public key that has been assigned to the licensee and is used to validate their identity, for example. The license certificate 140 should be digitally signed by the LGC 120 so that the components 130 can validate the authenticity of the certificate itself. Typically, the licensee embeds the license certificate 140 within its clients or access components 110. At runtime, the clients can download the license certificate 140 to protected components 130 to establish what they are licensed for.

Before a client can access a licensed feature of a protected device or component 130, it downloads its copy of the license certificate 140 to the device. This provides the device with information about the client or access component 110 that will want to access its protected features. When in possession of the certificate 140, the device decodes it and verifies its authenticity. It performs this by validating the digital signature within the certificate using a public key supplied by the third party 120. If this succeeds, the device can make the following assertions: The certificate is valid and has not been tampered with; and the certificate was originally issued by the LGC 120.

Typically, there is at least one more assertion that the device or component 130 performs before it can grant access to the features provided by the certificate 140 and entitles the licensee access thereto. Generally, the component 130 issues a challenge back to the client at 110. To successfully meet the challenge, the client or accessing component 110 decrypts the session key with its own embedded private key. To prove to the device or component 130 that it successfully decrypted the session key, it can produce a one-way hash of the session key and send it back to the device. If the hash matches the device's own hash of the session key, the challenge succeeds and the device can perform the assertion. As noted above, two-way authentication schemes can also be provided as will be described in more detail below. When the client or accessing component 110 has successfully proven to the device possesses the private key that was associated with the provided certificate 140, the device or component 130 can allow the client to access the licensed features that are specified by the certificate.

The device or component 130 can deny access to licensed features if any of the following examples are true: The client never provided a certificate; the certificate validation did not succeed e.g., the certificate was tampered with or it was not signed by the third party; The client failed to provide a hash of the decrypted session key; The client doesn't have a private key which matches the public key within the certificate; The certificate does not grant access to the specific feature the client attempts to access; The certificate contains an expiry time that is in the past or a validity time that occurs in the future; and/or The public key in the certificate matches a key within the device's revocation list.

Before proceeding, it is noted that the components 110 can include various computer or network components such as servers, clients, communications modules, mobile computers, wireless components, control components and so forth that are capable of interacting across the network 170. Similarly, the term PLC as used herein can include functionality that can be shared across multiple components, systems, and or networks 170. For example, one or more PLCs 130 can communicate and cooperate with various network devices across the network 170. This can include substantially any type of control, communications module, computer, I/O device, sensor, Human Machine Interface (HMI)) that communicate via the network 114 which includes control, automation, and/or public networks.

The network 170 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
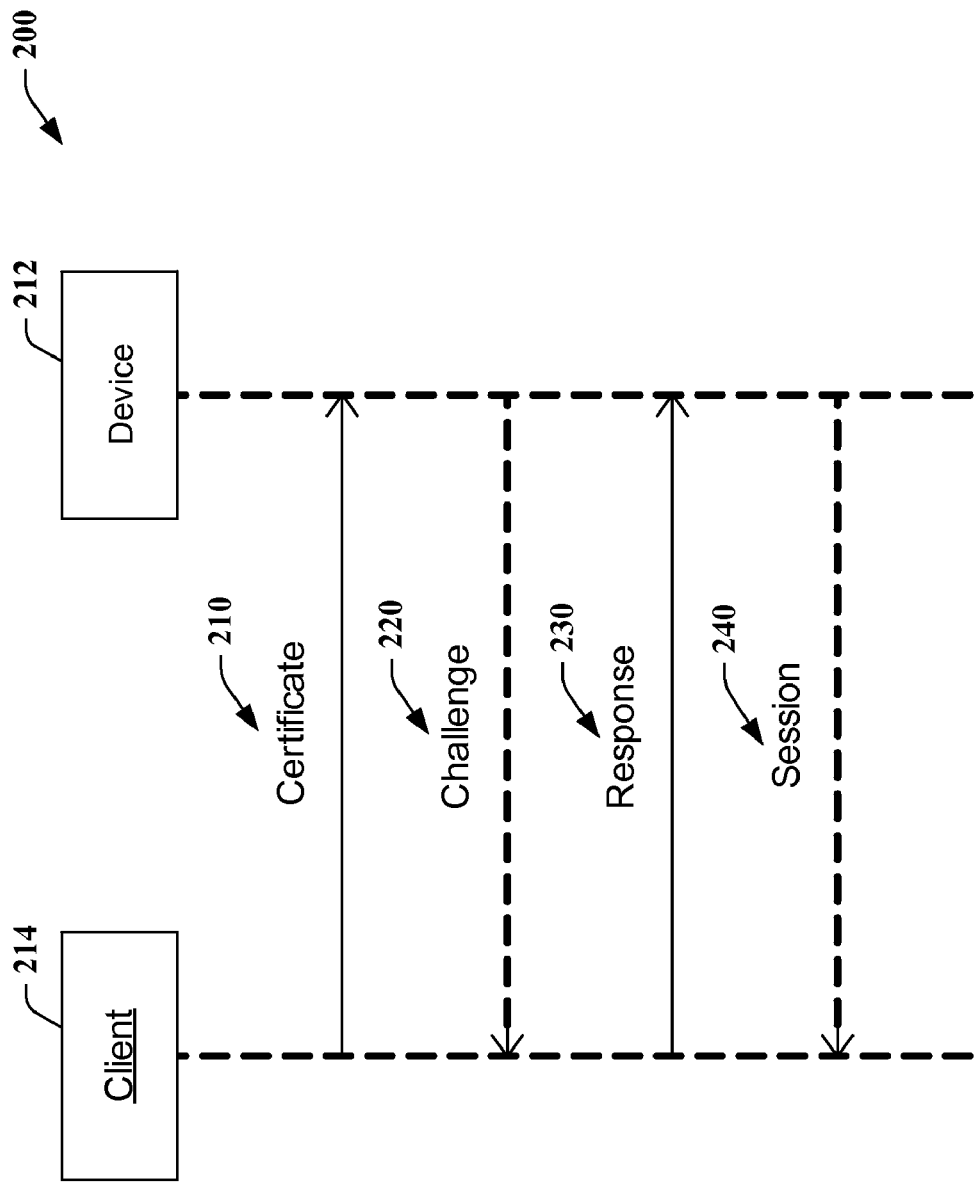
FIG. 2 is a diagram illustrating a one-way authentication process and licensing protocol.

Referring now to FIG. 2, a one-way authentication protocol and process is illustrated. As noted above, FIGS. 2-9 illustrate mutual authentication protocol and process aspects. While, for purposes of simplicity of explanation, the methodologies are shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Referring to FIG. 2, and at reference numeral 210, certificate messages are provided. Generally, prior to accessing a protected feature of a device 212, a client 214 presents its license certificate to the device at 210. It performs this by initiating a certificate message to the device at 210. The Certificate message 210 downloads the certificate message to the device. The Certificate message is a logical message that may, depending upon the actual size of the certificate document and the capabilities of the transport, be multiple actual physical messages.

Upon receipt of the Certificate message at 210, the device 212 decodes the certificate and processes it. For each principal section that the devices locates within the certificate, attempt to identify and verify the digital signature of the associated authority. For a simple license, there typically should be one principal section (for the licensee) and an authority element for the third party. The digital signature for the third party should reference the principal element and should verify properly using the third party public key (embedded within the device 212). If the digital signature for the principal properly verifies, then the device 212 can assume that the specific principal section of the certificate is valid, unmodified, and authentic.

At 220, a challenge message can be issued by the device 212. Even though a certificate may be proven authentic, the device should still confirm that the client 214 is associated with the principal identified within the certificate. Thus, the device prepares a challenge message to send back to the client at 220. To prepare a challenge message, the device 212 should create a random session key for example although other components could be employed. If the principal has an associated Key Info element that defines the public key for the principal, then the session key is encrypted with the defined key. If no key has been associated with the principal, then the session key can be placed into the challenge message unencrypted. The process of encrypting a session key can repeated for each principal within the certificate. The device 212 is free to reuse the same session key value for each principal, or to generate a new one for each principal instance, if desired. The set of encrypted session keys can be sent back to the client as a challenge to it, that it is the authorized holder of the certificate that it provided. The challenge message 220 is the logical response to the certificate message 210.

Proceeding to 230, a response message can be generated by the client 214. In order to meet the challenge 220 and prove to the device 212 that the client 214 is authorized, it decodes the challenge message and generates a matching response message at 230. The response message 230 is a matter of taking each encrypted session key in the challenge message 220 and decrypting it with the private key of the associated principal (which the client should have in its possession). To prove to the device 212 that it could successfully decode the challenge and the session keys, the client 214 produces a one-way hash of each session key and sends it to the device as the response message 230 to the challenge.

At 240, the last stage of the protocol 200 is to validate the response message 230 from the client and return a session message that identifies success or failure of the Challenge-Response negotiation. Here, the device 212 takes the hashed session keys from the response message 230 and compares them to the one-way hash of the session keys that it has performed. If they match, then the session can be successfully established. Note that a successfully established session implies that the device can trust the assertions made for the corresponding principal. If the assertion was a license assertion, then the client 214 can be licensed for the specified feature. It is possible for the client 214 to succeed the challenge on some sessions and not on others. The device should ensure that they have access to the features that they have rights based on the successfully established sessions.

Although the protocol 200 described above uses the term "session key" to describe the shared piece of information that is defined between the client 214 and the device 212, this value by itself does not represent an established communication session between the client and the device. It is assumed that most communications between the client and the device can take place in the context of a connection. The assertions associated with a session can be considered valid as long as the corresponding connection is maintained. If a connection is lost, the client may need to reestablish his rights by engaging in the licensing protocol 200 by issuing a new certificate message on the newly established connection. The licensing protocol 200 does not preclude the use of unconnected message exchanges. In that case, the "session key" may be used to establish a logical context between the client 214 and the device 212.

Figure 3:
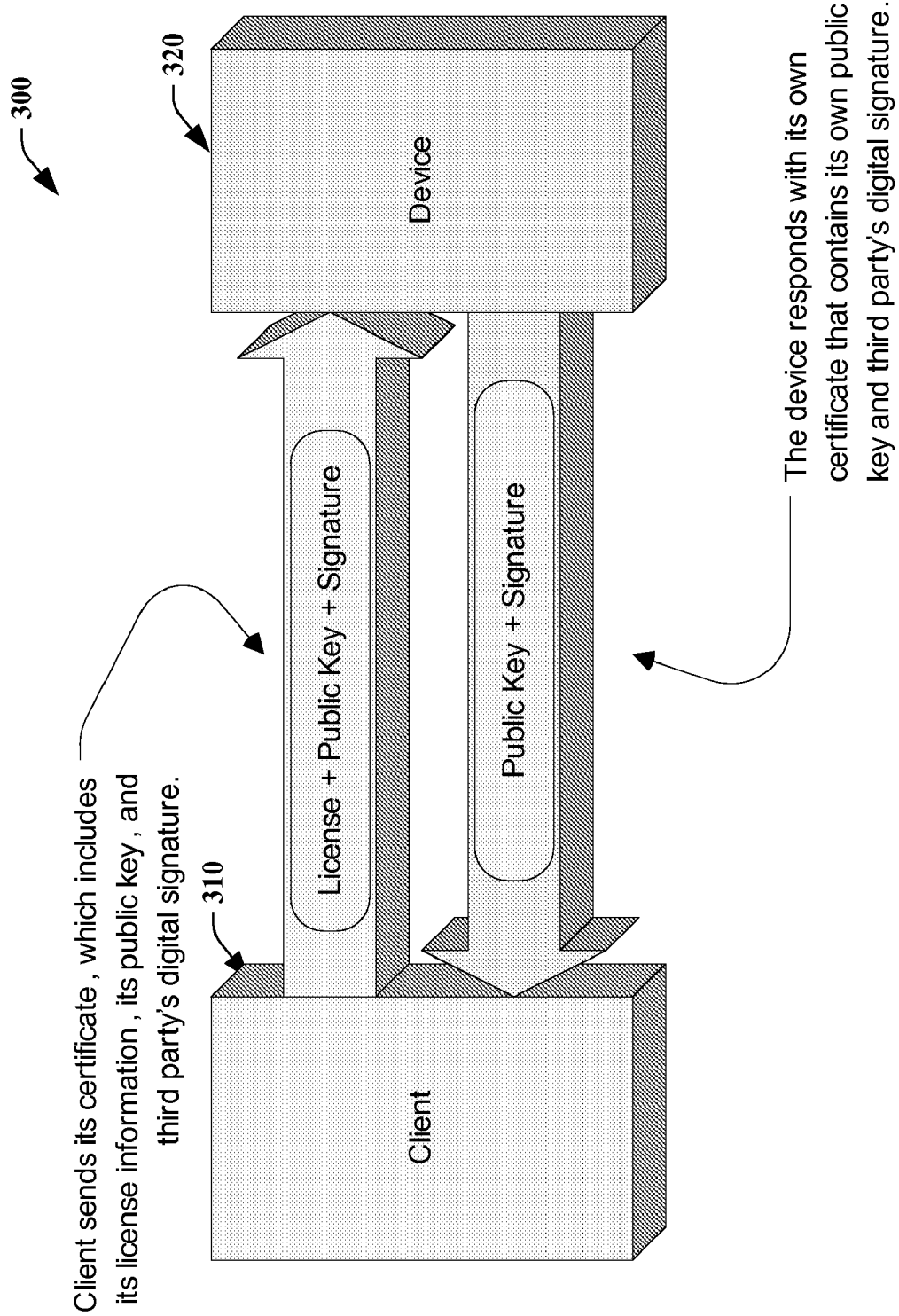
FIGS. 3-5 illustrate authorizing and licensing exchanges employing mutual authentication protocols.
Figure 4:
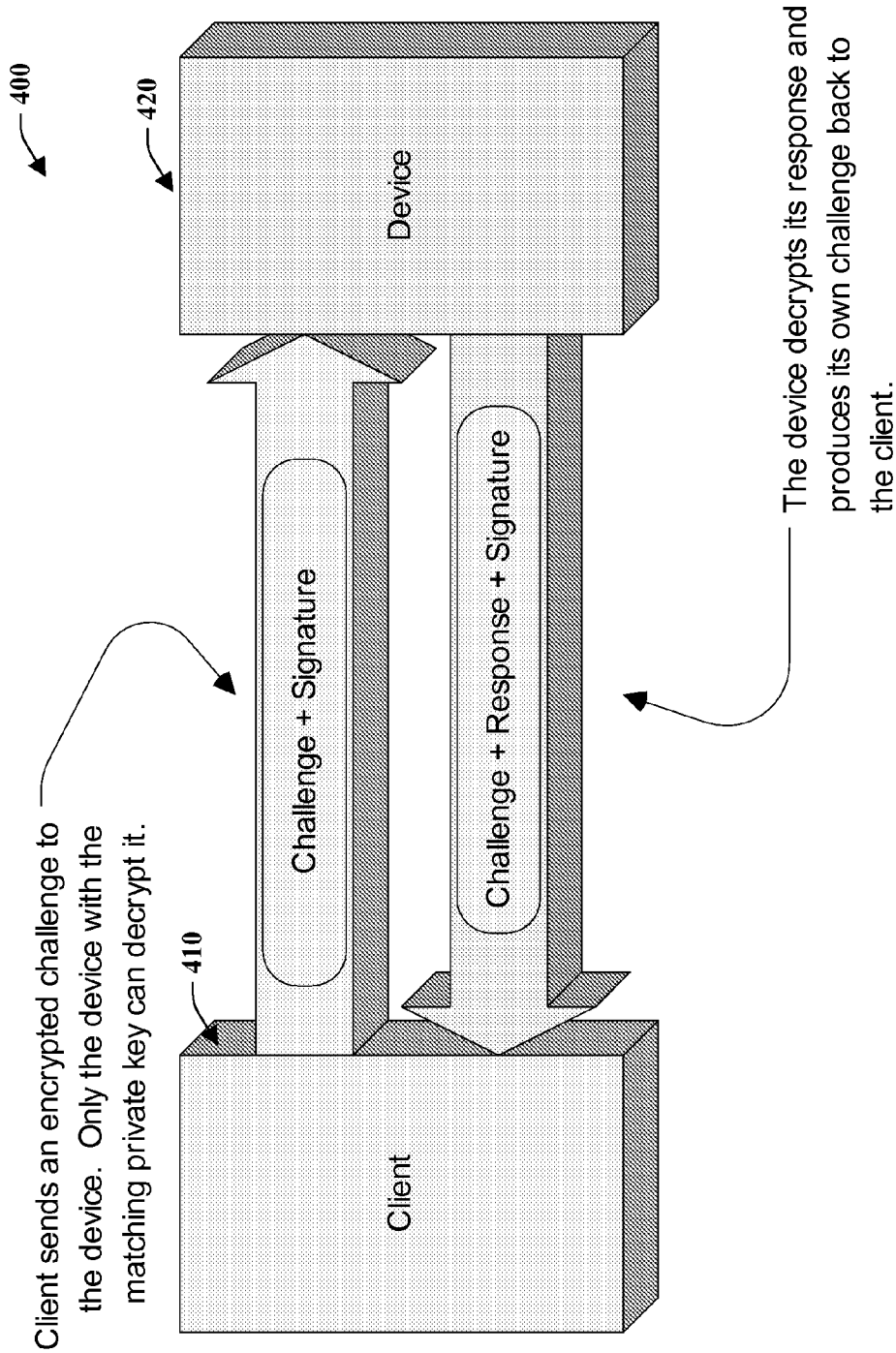
Figure 5:
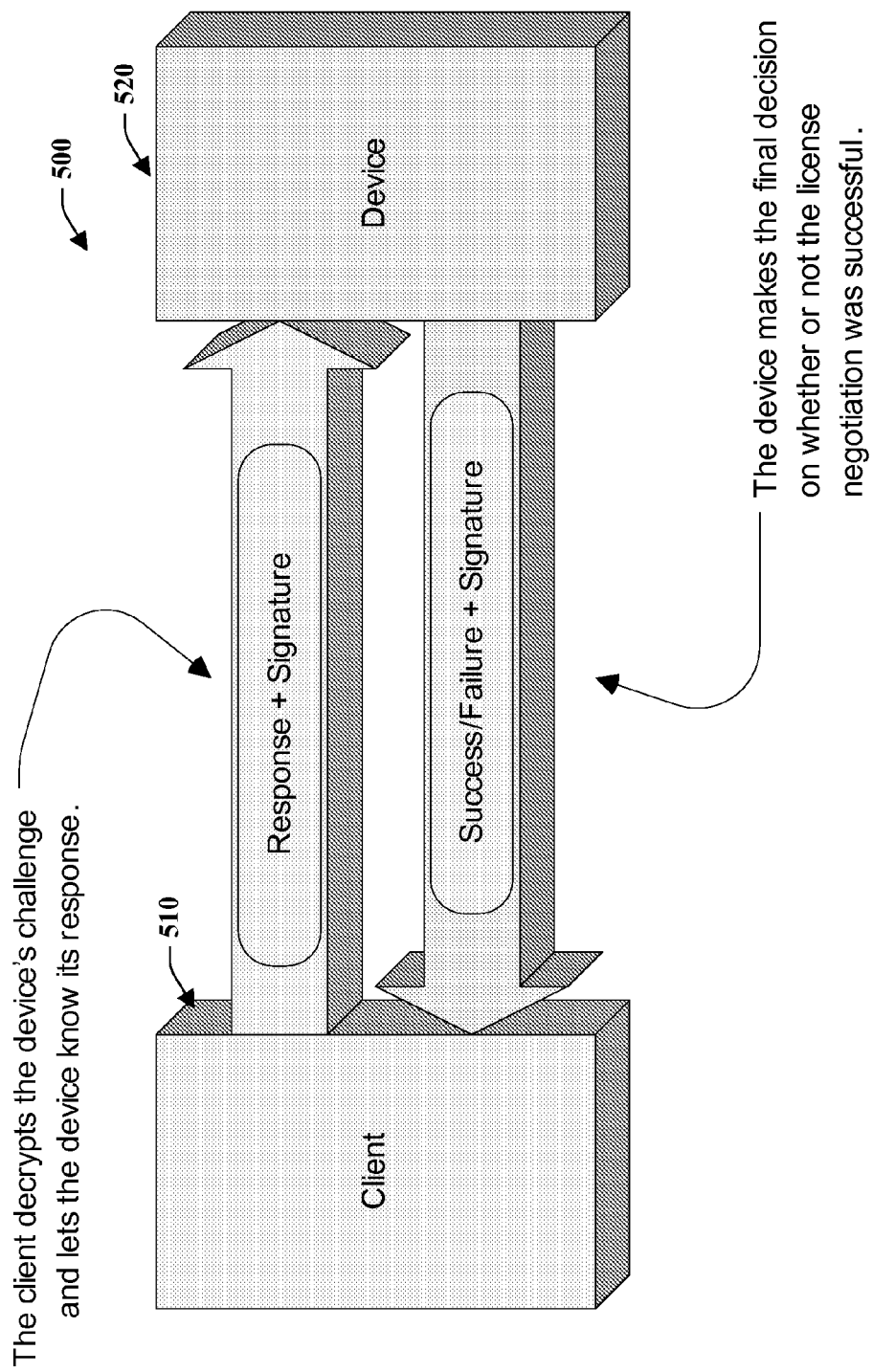

Turning to FIGS. 3-5, mutual authentication protocols are illustrated. Before proceeding, a general discussion is provided. Devices that support license protected services manage a number of electronic artifacts used in the implementation of the license exchange and validation process. This can include an identity certificate for businesses or third parties that includes a public key that is used to identify valid license certificates issued to licensees. An identity certificate can be provided for hardware or software that was issued by and digitally signed by the third party. This certificate includes the public key of the hardware/software component. Another component can include a hardware private key that corresponds to the public key in the hardware identity certificate. An optional revocation list can be provided that includes information about which previously granted licenses have been revoked by the third party or business entity.

The device should protect all of these artifacts from tampering. However, two of them have additional handling requirements that the device should respect. The device private key is confidential data that should not be known by any other entity. To that end, the device should take steps to keep the private key of the device well hidden and protected from inspection. The revocation list is data that may not remain static over the service life of the device. The device should have some means of allowing the revocation list to be updated.

When a licensee obtains a license from the third party, the licensee should receive electronic copies of at least three artifacts used in the license authentication protocol. This can include an identity certificate for the third party that contains a public key and is used to validate certificates provided by devices or components. A license certificate can be provided which can be used to demonstrate to the protected hardware the existence of a valid license that has been issued by the third party. A private key can also be employed which can be used by licensees to prove themselves as the authentic holder of the license certificate. In order to access a license protected feature of a device, the licensee and the device should engage in an exchange and verification protocol in which they exchange their respective certificates and generate challenges for each other to respond to. This protocol can employ at least three bi-directional exchanges in order to accomplish its goals as illustrated in FIGS. 3-5.

Proceeding to FIG. 3, a certificate exchange 300 is illustrated. A client 310 initiates the protocol by sending a device 320 its certificate. This provides the device 320 with identity information about the client 310, because the certificate includes the client's public key, and the services of the device that it is allowed to access. When in possession of the certificate, the device 320 decodes it and verifies its integrity and authenticity. The device 320 performs this by validating the digital signature within the certificate using the third party's public key. It also checks the public key embedded within the client certificate against its revocation list. If this succeeds, the device can make the following assertions: The licensee certificate is valid and has not been tampered with; the licensee certificate was originally issued by the third party; and the licensee certificate can be used to identify which services on the device the client is licensed to use.

If successful, the device 320 responds with its own identity certificate and the client decodes and verifies the integrity and authenticity of the device's certificate and verifies that the device's public key has not been revoked. If successful, the device can make a similar set of assertions including: The device certificate is valid and has not been tampered with; and the device certificate was originally issued by the third party.

FIG. 4 illustrates a challenge exchange process 400. After exchanging and validating certificates, the two parties (or more) have an understanding of who each other are claiming to be, and a device 420 knows what a client 410 is asserting its licensed rights to be; however, they do not have any confidence that the other party is the valid holder of the certificate they just presented. They have done nothing to authenticate the other. Building that confidence is one possible reason for the next two exchanges illustrated at FIGS. 4 and 5.

To initiate the challenge exchange 400, the client 410 prepares a non-deterministic challenge for the device 420. This challenge is encrypted with the public key of the device and digitally signed by the client. Encrypting the challenge ensures that only the device with the proper private key can successfully respond to the challenge. In response, the device 420 decodes the challenge and prepares its own similar looking challenge back to the client. Its challenge to the client also incorporates a non-deterministic challenge encrypted with the client's public key and digitally signed by the device. By digitally signing the messages, the client 410 and device 420 have an additional level of guarantee that the message was produced by the holder of the public key and has not been tampered with during its trip.

To reduce the number of round trips, the device's challenge to the client 410 includes its response to the client's challenge. This response can be included within the encrypted part of the data the device 420 sends back to the client 410. After this exchange, at least one more assertion can be made by the client where the device is considered a valid holder of the presented device certificate.

Turning to FIG. 5, a session establishment process 500 is illustrated. In this aspect, a device 520 desires a similar confidence that a client 510 is indeed a valid holder of the license certificate that was presented during the certificate exchange described above. To complete the licensing exchange, the client 510 responds to the device challenge presented in the previous exchange. When the device 520 has confirmed that the client successfully interpreted its challenge, the licensing exchange and verification is complete. The device is able to now make the corresponding assertion about the client 510 that the client is the valid holder of the presented licensee certificate.

At this point the device can allow the client to access the licensed features that are specified by the certificate. The device can deny access to licensed features if any of the following are true: the client never provided a certificate or the certificate was an unsupported format; the certificate validation did not succeed; the client 510 failed to provide a response to its challenge; the client doesn't have a private key which matches the public key within the certificate; the certificate does not grant access to the specific feature the client attempts to access; the certificate contains an expiry time that is in the past or a validity time that occurs in the future. This information is contained with attributes section and can be used with devices that have knowledge of current time; and/or the license information in the certificate matches information in the device's revocation list. This may indicate that although the client has a valid license and credentials, the granted license has been revoked from the licensee.

Figure 6:
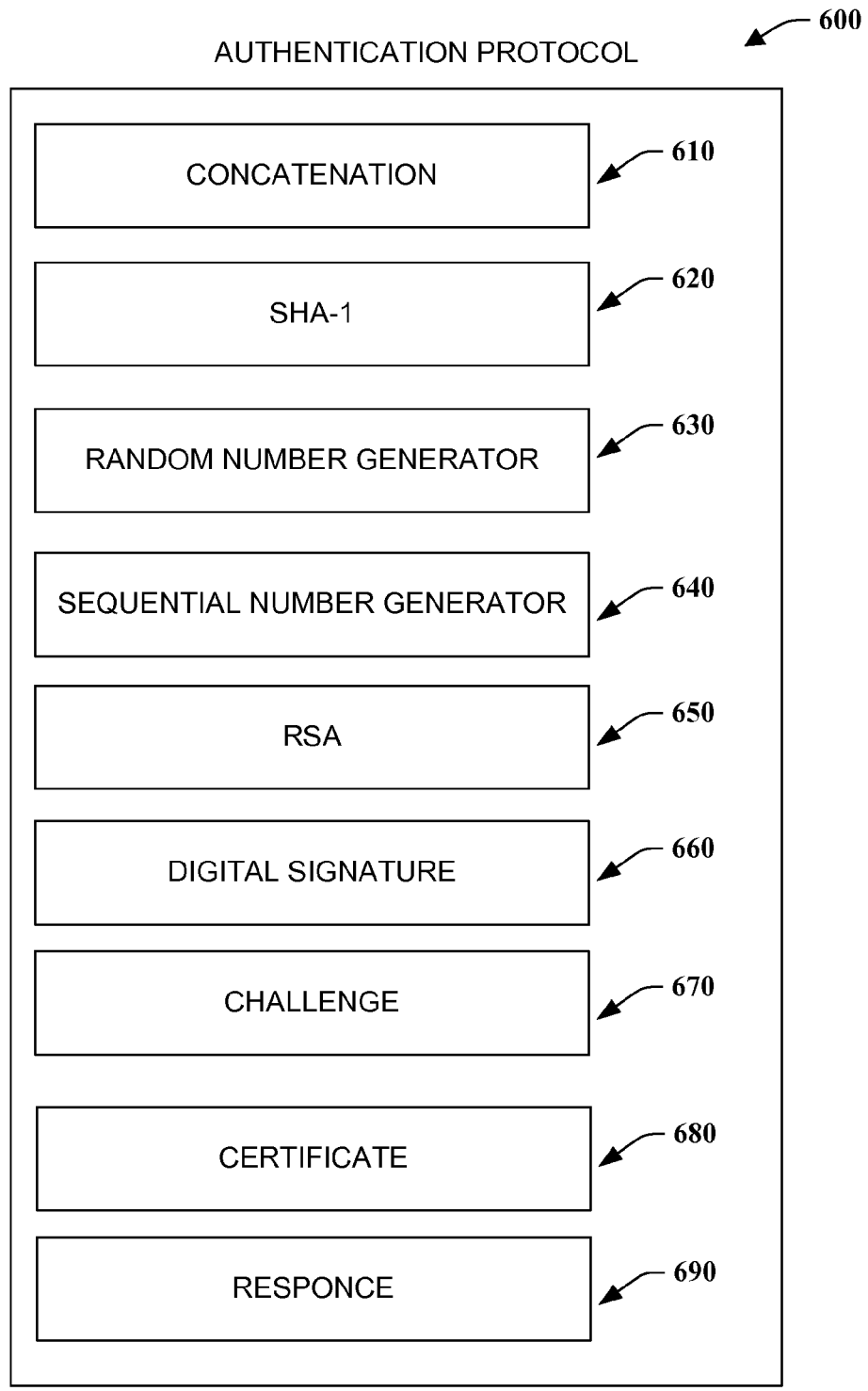
FIG. 6 illustrates an example license authentication protocol.

Referring to FIG. 6, example aspects of a license authentication protocol 600 are illustrated. The following components of the protocol 600 can be provided:

At 610, Concatenation is the process of combining a string of bytes together. At 620, SHA-1 is a cryptographic hash function that takes a string of bytes (message) of any length and produces a fixed length string of bytes (e.g., 20 bytes).

At 630, Random Number is a value from a sequence that has no discernible pattern. For this application of random numbers, it is desired that the source of random numbers be statistically random and derived from a non-deterministic cause. At 640 a Sequence Number is a value from a sequence that may have a discernible pattern. If the sequence number is based on a time pattern, then the representation "TIMEx" is used. To the extent that the device is capable to represent time, the time value should include date values and the representation of time granularity to fractional seconds if possible. At 650, RSA is an asymmetric encryption and decryption algorithm. A message can be transformed into an encrypted message using the public or private key, such that it can be transformed back into the original message using the other key. At 660, a Digital Signature is a method of authenticating a message by employing complementary algorithms. At 670, a Challenge is a single use value (nonce) used for authentication and to avoid replay attacks. At 680, a Certificate is a block of data that encodes at minimum the licenses and public key of the holder, and is digitally signed by the certificate issuing authority. At 690, a Response is a block of data that identifies the success or failure of the session establishment protocol.

Figure 7:
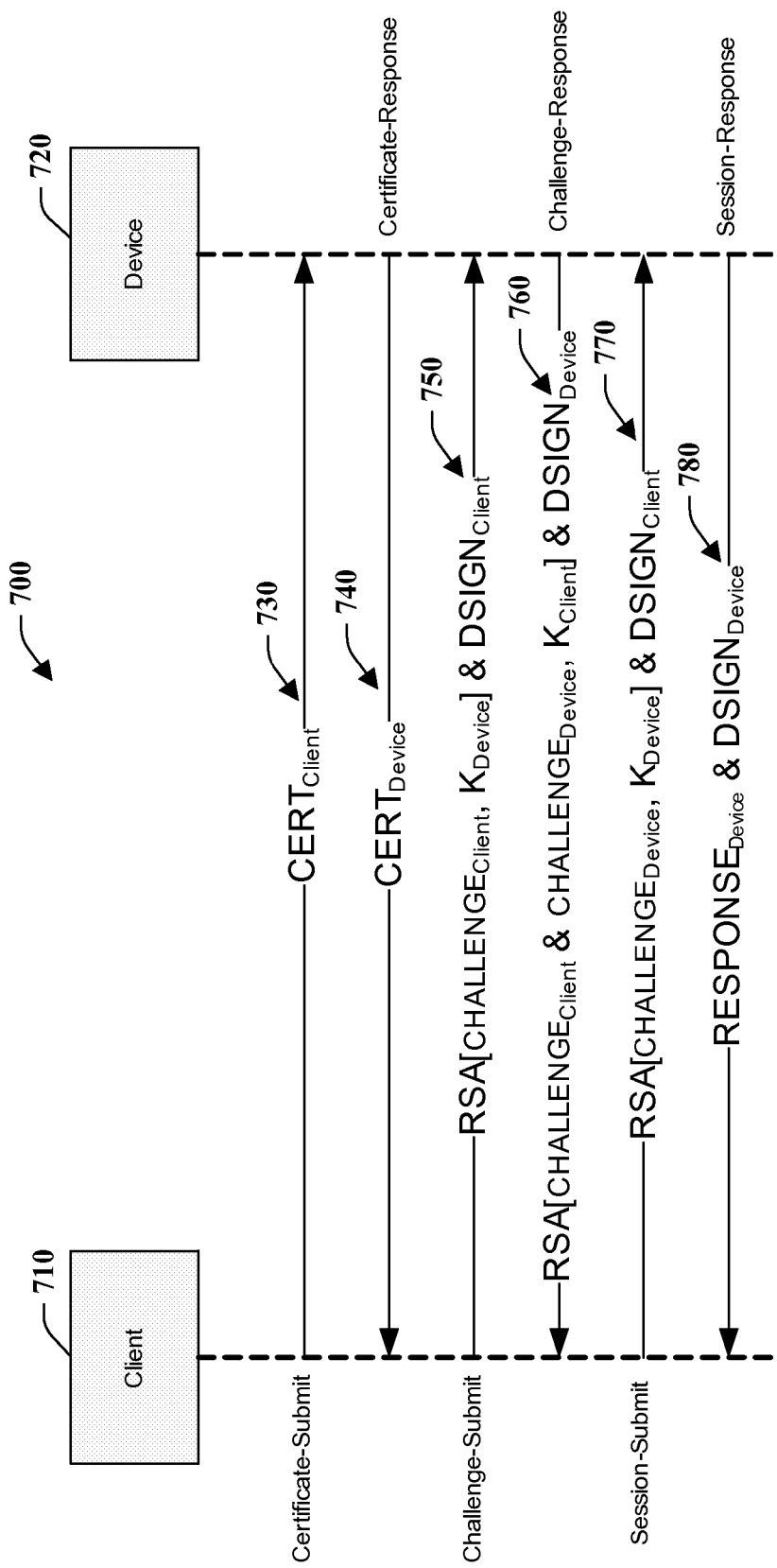
FIG. 7 is a diagram illustrating a nonce concatenation to form a licensed connection.

Now turning to FIG. 7, an example protocol exchange 700 is illustrated. The exchange 700 is between a client 710 and a device 720 but other components such as servers or industrial communications modules could also be involved for example. At 730, the client 710 issues a Certificate-Submit message to the device 720. One purpose of this message is to download the client's certificate to the device 720 and obtain the device's certificate. Upon receipt of the Certificate-Submit message the device 720 decodes the certificate and processes it. Processing the certificate involves validating the digital signature against the device's known public key for the certificate issuing authority (specifically the public key of third party). If the digital signature verifies, then the device 720 can assume that the certificate is valid, unmodified, and authentic. If the certificate is invalid for any reason, an error response can be returned to the client instead of a Certificate-Response message at 740.

At 740, the device 720 responds to the Certificate-Submit message 730 by sending the client's its own certificate. This certificate should also be digitally signed by the certificate issuing authority (third party). Upon receipt of the Certificate-Response message 740, the client 710 decodes the certificate and process it validating the digital signature to assure that the certificate is valid, unmodified, and authentic. Clients can also support revocation list that could be used to reject a device's certificate.

At 750, even though the exchanged certificates may prove to be authentic, the two parties still confirm that the other is the actual party that is identified within the certificate. To perform this, the client 710 initiates a challenge to the device at 750 (and the device will respond with its own challenge back to the client). As indicated earlier, the challenge can be composed of a single-use set of values (nonce). The client 710 uses a random number generator to create a random sequence of bytes and then concatenates them with a sequence value and the current time value. An implementation should strive to provide a random byte sequence of 16 bytes for example, although a minimal implementation may use a sequence as short as 4 bytes long. This set of bytes is then turned into a fixed length set of bytes using the SHA-1 hash algorithm. This sequence of 20 bytes can be referred to as the CHALLENGE-Client value.

The client 710 forms the challenge message 750 for the device by encrypting this value with the public key of the device (obtained from the device's certificate) and digitally signing the result with its own private key. This challenge message 750 is then submitted to the device. In order to respond to the challenge, the device 720 validates the digital signature of the message and decodes the original CHAL-LENGEClient value by decrypting the message data with its own private key. If the Challenge-Submit message 750 is invalid (such as an invalid signature), an error response is returned rather than a Challenge-Response message 760.

At 760, the Challenge-Response message that is sent back to the client 710 has a dual purpose. It can be used to begin authentication of the client 710 to prove that it is the valid holder of the CERTClient certificate that was transmitted during the Certificate-Submit message 730. Also, it can be used to answer the client's challenge. In doing so, it proves to the client that it is the valid holder of the CERTDevice certificate that was transmitted during the Certificate-Response message 740.

Generally, the device 720 produces its own CHAL-LENGEDevice data using the same algorithm used by the client 710 to produce its challenge data. It generates a random sequence of bytes, and concatenates a sequence number and time value, then produces an SHA-1 hash of the entire sequence. The CHALLENGEClient and CHALLENGEDevice data blocks can be concatenated together into a 40 byte block of data that is then encrypted with the client's public key (obtained from the CERTClient certificate). The result is then digitally signed by the device 720 to prove its authenticity.

When the client 710 receives the response message 760, it validates the digital signature and then decrypts the message data. When decrypted, the client 710 should find the CHAL-LENGEClient data block that it originally sent to the device. If this data block matches the original data block sent by the client 710, then the device 720 has successfully responded to the client's challenge at 760 and the client 710 can assume that the device is a valid holder of the CERTDevice certificate that was received in the Certificate-Response message 740. If the Challenge-Response message 760 is invalid, the client aborts the license attempt and does not proceed on to a Session-Submit message at 770. The client 710 should also find a CHALLENGEDevice data block that was produced by the device 720. The final step of the process is for the client 710 to prove to the device 720 that it was able to properly decode this value.

At 770, the remaining assertion that yet needs to be verified is that the client 710 is the valid holder of the CERTClient certificate that was submitted in the initial Challenge-Submit message 750. To perform this, the client 710 takes the CHAL-LENGEDevice data that was obtained in the Challenge-Response message 760 and encrypts it with the device's public key, digitally sign the message and sends it back to the device 720. When the device 720 receives the Session-Submit message 770, it validates the digital signature of the client 710 and then decodes the encrypted data block. The device 720 should find the same CHALLENGEDevice byte sequence that it sent to the client in the Challenge-Response message 760. If this is the same set of bytes, then the client 710 has successfully responded to the challenge and the device 720 can trust that the client is the valid holder of the CERTClient certificate that it received in the Certificate-Submit 730.

At 780, the last step of the process 700 is for the device 720 to indicate to the client 720 whether or not the license session was successfully established. The device 720 prepares a response that indicates to the client whether or not the device will allow the session. The response includes information about which licenses were accepted and which were rejected. It then digitally signs this response and sends it back to the client as the Session-Response message. When this message 780 is received by the client 710, it can verify the digital signature and know whether or not is has access to the license protected features. It is possible for the client 710 to succeed the challenge on some sessions and not on others. The device 720 should ensure that the clients 710 have access to the features in the context of their successfully established sessions.

Figure 8:
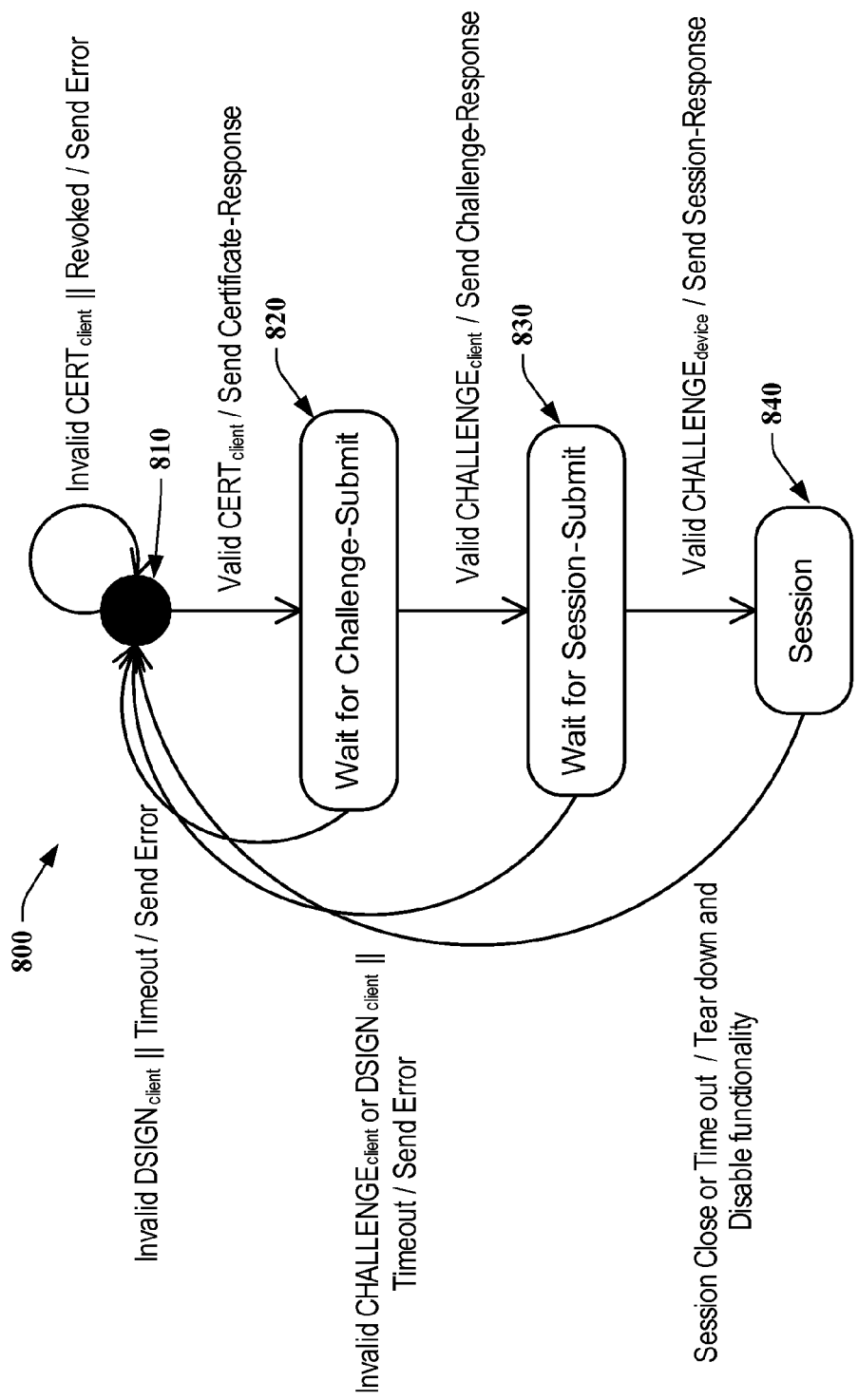
FIG. 8 illustrates an exemplary state diagram for message exchange.

FIG. 8 illustrates exemplary state diagram 800 for message exchange. Although four states are illustrated, it is to be appreciated that more that four states can be provided. The state diagram 800 includes four states such as an initial state 810, a wait for challenge submit state 820, a wait for session submit state 830, and a session state 840. As shown, transitions for entering a respective state other than the initial state 810 include receiving a valid client certificate or sending a valid certificate-response, receiving a valid challenge or sending a challenge response, and/or receiving a challenge at a device or sending a session response. Reasons for exiting a respective state include invalid signatures, timeouts, errors detected, invalid challenges, and/or a session close out or time out. As can be appreciated, other transitions can be provided for within a respective state.

Figure 9:
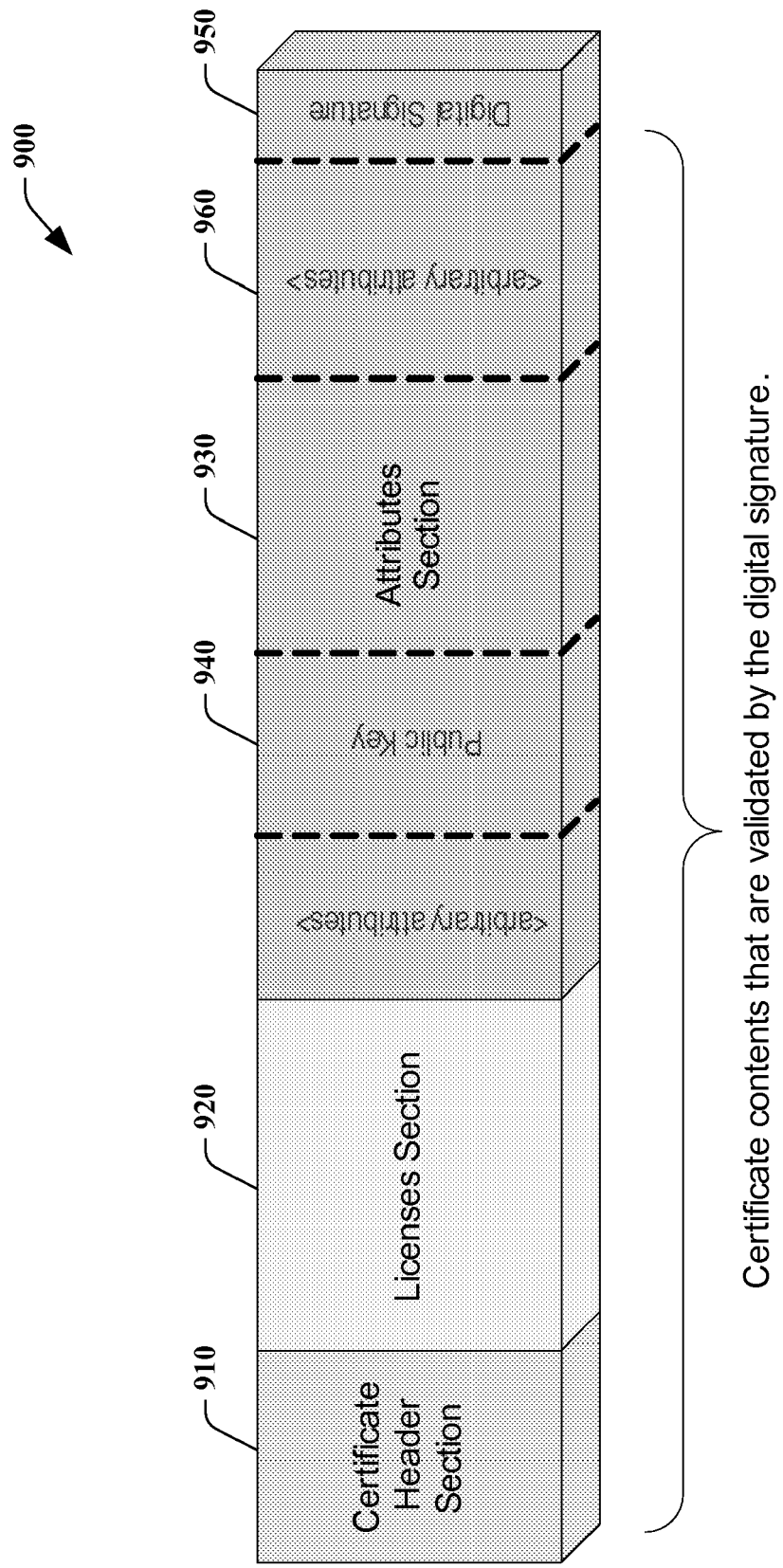
FIG. 9 illustrates an exemplary licensing certificate.

Referring to FIG. 9, an example certificate 900 is illustrated. Cryptographic licensing can employ a binary certificate 900 that meets the needs of the embedded environment. The certificate 900 can be designed to be compact in its representation, yet expressive and extensible in its content. The general organization of the certificate is in three parts. A Certificate Header Se910 section defines the size and format version of the certificate 900. A Licenses Section 920 is a variable length section that defines the licenses granted by the certificate. An Attributes Section 930 is a variable length section that can include a number of additional attributes about the certificate 900. Typically, there are two attributes that are found in this section 930. A "Public Key" 940 defines the public key associated with the holder of this certificate 900. A "Digital Signature" attribute 950 provides validation for all the data in the certificate that precedes it. The certificate header section 910 can include components of the following table:

| Name | Data Type | Description |
| --- | --- | --- |
| Certificate Length | UINT | Length of the certificate in bytes. |
| Certificate Type | UINT | The format type of certificate. The only defined values for this attribute are: 0 - An "Identity certificate". It contains an Attributes section, but not Licenses section. This type of certificate can be used to represent the public key of the authority without implying any licenses. 1 - A "License certificate". It includes a Licenses section and the Attributes section includes a public key and a digital signature. |
| Certificate Version | UINT | Version of the certificate. Initially set to value of 1. |

The Licenses section appears 920 in any certificate that is used for licensing. Its purpose is to define the set of licenses that have been granted to the valid holder of the license certificate 900. The section 920 is a counted set of license structures as defined by the following table.

| Name | Data Type | Description |
| --- | --- | --- |
| License Count | UINT | Number of members in the License List. |
| License List | ARRAY of STRUCT: | The license list is an array of individual licenses granted to the valid holder of the certificate. |
| License Key | UINT | Numeric identifier of the specific granted license. |
| License Instance | UINT | Numeric value which qualifies the specific instance granted license. Since granted licenses can be revoked and potentially reinstated, the revocation information specifies which instance of the license has been revoked. |

The Attribute section 930 includes a set of typed parameters that provide additional information about the certificate. The Attribute section 930 can be designed for extensibility in that new attributes may be introduced overtime. The number of Attributes within the Attribute section is not predetermined; where implementations should parse the Attribute section up to length of the certificate. Primary Attributes 960 that may be found in this section 930 are the Public Key attribute (which communicates the public key of the certificate holder) and the Digital Signature (which validates the certificate authenticity from the certificate issuer). The digital signature attribute 950 can be assumed to validate all the certificate data that precedes it. This implies that it should be the last attribute in the Attributes section 930.

The format of an Attribute can be defined as in the following table:

| Name | Data Type | Description |
| --- | --- | --- |
| Attribute Type | UINT | The type of the certificate. Attribute types are encoded with information that allows an implementation to know how to handle new attribute types. The high-bit of the Attribute Type is zero if an implementation is free to ignore an Attribute Type that it does not understand. The high-bit can be set to one if a conforming implementation should understand the semantics of the attribute. If the implementation encounters an Attribute Type within the certificate that it does not understand or cannot support, and the high-bit is set, then the implementation should fail the certificate validation process. |
| Attribute Length | UINT | The length of the attribute in bytes. |
| Attribute Data | ARRAY of USINT | The data value associated with the Attribute. The interpretation of this data is dependent upon the type of Attribute Type. |

Figure 10:
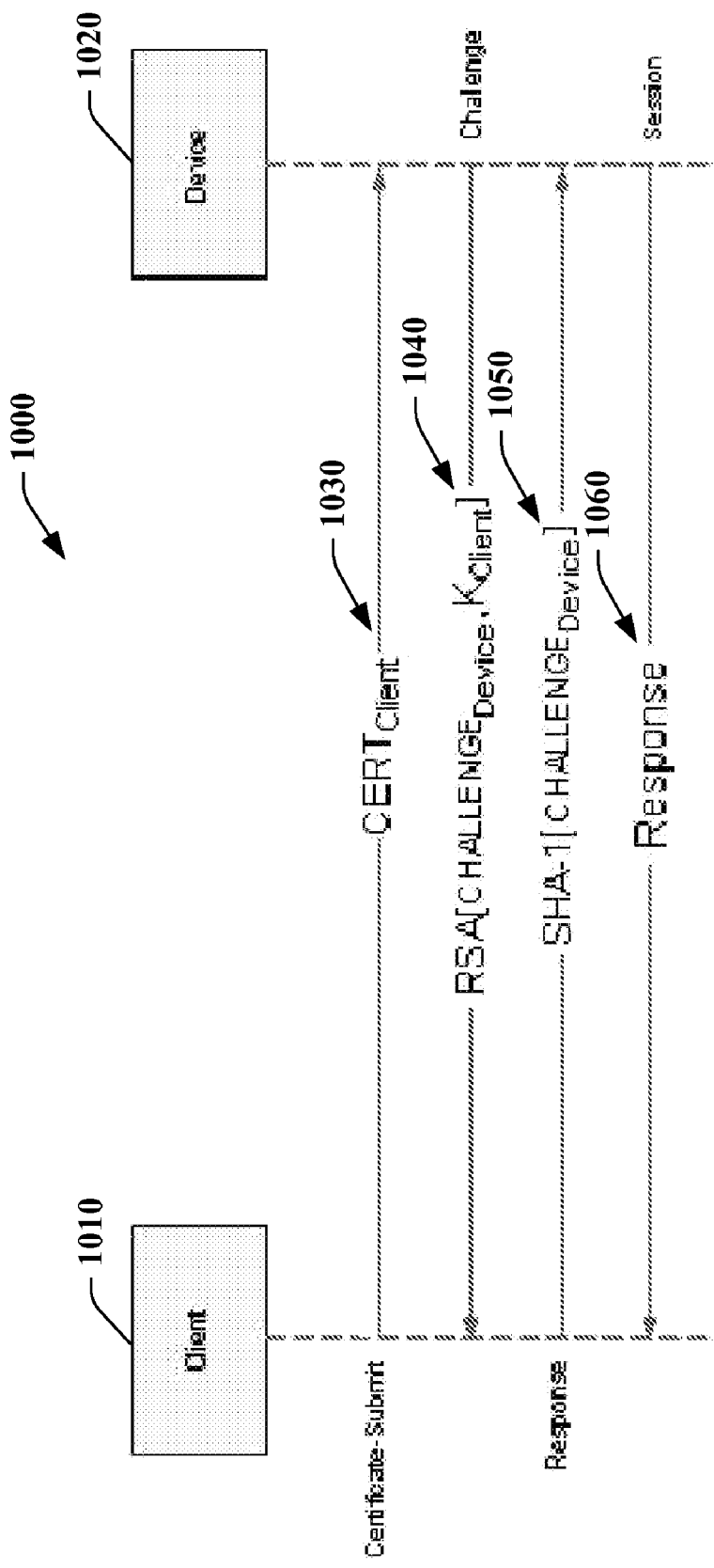
FIG. 10 illustrates a simplified message exchange process.

FIG. 10 illustrates a simplified message exchange process 1000. In the simplified exchange 1000, a client 1010 submits a certificate 1030 to a device 1020. The device 1020 verifies the certificate is valid whereby the device now has the client's public key. The device 1020 generates a nonce (number used only once), where the nonce is hashed and encrypted with the client's public key and sent to the client at 1040 as part of a challenge. The client 1010 decrypts the data sent, hashes the data, and sends it back as a response 1050. The device 1020 compares the client's response with the expected value and if identical the client is licensed. At 1060, a session response is sent by the device 1020 indicating a session has been established.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An industrial automation system, comprising:
one or more processors communicatively coupled to one or more memory, the one or more memory having stored therein computer-executable instructions to implement the system, including:
at least one client license component granted by a license generating component (LGC) to permit access to a portion of an industrial control component; and
at least one client component configured to employ a protocol that is based in part on an asymmetric key exchange to facilitate authentication and access by the client to the portion of the industrial control component, wherein the protocol comprises:
the at least one client component is further configured to transmit the at least one client license component to the industrial control component;

the at least one client component is further configured to receive a device license component from the industrial control component;

the at least one client component is further configured to authenticate the device license component, and to transmit a client challenge to the industrial control component;

the at least one client component is further configured to receive a device challenge and a response to the client challenge from the industrial control component;

the at least one client component is further configured to authenticate the response to the client challenge, decode the device challenge, and transmit a response for the device challenge to the industrial control component; and the at least one client component is further configured to receive a session response from the industrial control component indicating whether a session has been established between the at least one client device and the industrial control component.

2. The system of claim 1, the asymmetric key exchange is associated with at least one of a private or public key component.

3. The system of claim 1, at least one of the device license component or the at least one client license component is a digital certificate.

4. The system of claim 3, the digital certificate comprises at least one of a header section, a license section, or an attributes section.

5. The system of claim 3, the digital certificate comprises at least one of a public key component or a digital signature component.

6. The system of claim 3, the digital certificate comprises a at least one of certificate length, a certificate type, or a certificate version component.

7. The system of claim 3, the digital certificate comprises at least one of a license count, a license list, a license key, or a license instance.

8. The system of claim 3, the digital certificate comprises at least one of an attribute type, and attribute length, or an attribute data component.

9. The system of claim 1, at least one of the industrial control component or the at least one client component comprises a revocation list that provides information indicating previously granted client and device license components that have been revoked.

10. The system of claim 9, the at least one of the industrial control component or the at least one client component determines that the client license or device license component is invalid if the client license or device license component is included in the revocation list.

11. The system of claim 1, the protocol further comprising at least one of a sequential number generator or a random number generator.

12. The system of claim 1, the protocol further comprising a number used only one (nonce) generator to facilitate authentication, wherein the device challenge includes a nonce.

13. The system of claim 1, the protocol further comprising at least one of a SHA-1 component, a concatenation component, or a random number generator.

14. The system of claim 1, the protocol further comprising an asymmetric encryption or decryption algorithm.

15. The system of claim 1, the protocol further comprising at least one of a challenge component, a certificate component, or a response component.

16. A non-transitory computer readable medium having computer executable instructions stored thereon to facilitate licensing in an industrial automation environment, comprising instructions for:

obtaining a client certificate from at least one third party component, wherein the client certificate is associated with a client component;

sending the client certificate to an industrial control component;

receiving a device license component from the industrial control component;

authenticating the device license component and transmitting a client challenge to the industrial control component;

receiving a device challenge and a response to the client challenge from the industrial control component;

authenticating the response to the client challenge, decoding the device challenge and transmitting a response for the device challenge to the industrial control component; and receiving a session response from the industrial control component indicating whether a session has been established with the industrial control component.

17. The non-transitory computer readable medium of claim 16, further comprising instructions for employing a revocation list that provides information indicated previously granted at least one of client or device certificates that have been revoked in order to authenticate the client certificate.

18. The non-transitory computer readable medium of claim 16, further comprising instructions for determining that the client or device certificate is invalid if the client or device certificate is included in the revocation list.

19. The non-transitory computer readable medium of claim 16, further comprising instructions for establishing a session between the client component and the industrial control component.

20. The non-transitory computer readable medium of claim 16, further comprising instructions for employing a public key to validate a signature associated with the digital certificates.

21. A licensing method for industrial control components, comprising:

obtaining a client certificate from at least one third party component, wherein the client certificate is associated with a client component;

sending the client certificate to an industrial control component;

receiving a device license component from the industrial control component;

authenticating the device license component and transmitting a client challenge to the industrial control component;

receiving a device challenge and a response to the client challenge from the industrial control component;

authenticating the response to the client challenge, decoding the device challenge, and transmitting a response for the device challenge to the industrial control component; and receiving a session response from the industrial control component indicating whether a session has been established with the industrial control component.

22. The method of claim 21, employing a revocation list that provides information indicated previously granted at least one of client or device certificates that have been revoked in order to authenticate the client certificate.

23. The method of claim 22, determining that the client or device certificate is invalid if the client or device certificate is included in the revocation list.

24. The method of claim 21, further comprising establishing a session between the client component and the industrial control component.

25. The method of claim 21, further comprising employing a public key to validate a signature associated with the digital certificates.

26. The method of claim 25, further comprising generating an error message if the signature is determined invalid.

27. The method of claim 21, the device challenge includes a number used only one (nonce).

28. A licensing system for an industrial control environment, comprising:
- means for issuing a client certificate, wherein the client certificate is associated with a client component;
- means for sending the client certificate to an industrial control component;
- means for receiving a device license component from the industrial control component;
- means for authenticating the device license component and transmitting a client challenge to the industrial control component;
- means for receiving a device challenge and a response to the client challenge from the industrial control component;
- means for authenticating the response to the client challenge, decoding the device challenge, and transmitting a response for the device challenge to the industrial control component; and
- means for receiving a session response from the industrial control component indicating whether a session has been established with the industrial control component.

* * * * *